United States Patent [19]
Voorhees

[11] 3,774,695
[45] Nov. 27, 1973

[54] SAND TRAP CONDITIONING DEVICE

[75] Inventor: Maynard K. Voorhees, Cedar Falls, Iowa

[73] Assignee: Standard Manufacturing Company, Cedar Falls, Iowa

[22] Filed: Apr. 10, 1972

[21] Appl. No.: 242,632

[52] U.S. Cl................ 172/691, 172/762, 172/767
[51] Int. Cl........................................... A01b 35/08
[58] Field of Search...................... 172/29, 311, 613, 172/614, 615, 616, 619, 620, 624, 626, 627, 629, 634, 635, 640, 641, 645, 647, 649, 685, 691, 694, 697, 721, 734, 741, 742, 748, 762, 767, 772, 779

[56] References Cited
UNITED STATES PATENTS

| 3,103,980 | 9/1973 | Bronleewe | 172/626 X |
|---|---|---|---|
| 298,858 | 5/1884 | Johnson | 172/647 X |
| 722,261 | 3/1903 | Stewart | 172/614 |
| 1,264,678 | 4/1918 | Packard | 172/624 X |
| 1,530,350 | 3/1925 | Cassada | 172/691 X |
| 2,010,979 | 8/1935 | Crawford | 172/721 |
| 2,748,684 | 6/1956 | Kirby | 172/742 X |
| 2,797,629 | 7/1957 | Kelley | 172/614 X |
| 3,321,028 | 5/1967 | Groenke | 172/311 |
| 3,327,787 | 6/1967 | Adee | 172/311 |
| 3,613,802 | 10/1971 | Carlson et al. | 172/620 X |

Primary Examiner—Robert E. Pulfrey
Assistant Examiner—Paul T. Sewell
Attorney—Donald H. Zarley et al.

[57] ABSTRACT

A sand trap conditioning device is disclosed herein and generally comprises an elongated laterally extending frame means adapted for towing behind a prime mover. A plurality of substantially flat vanes are secured to the frame means and extend below the frame means to penetrate the sand. The vanes are disposed in an oblique plane with respect to the frame means so as to permit the vanes to move the sand upwardly and laterally from the lower portion of the vanes to move and dress the sand and to permit drying of the sand. An adjustment means is provided on the frame means for adjusting the position of the vanes in a simultaneous manner. A portion of the frame means is flexible in a vertical direction to permit the frame means to conform to surface variations in the sand.

5 Claims, 8 Drawing Figures

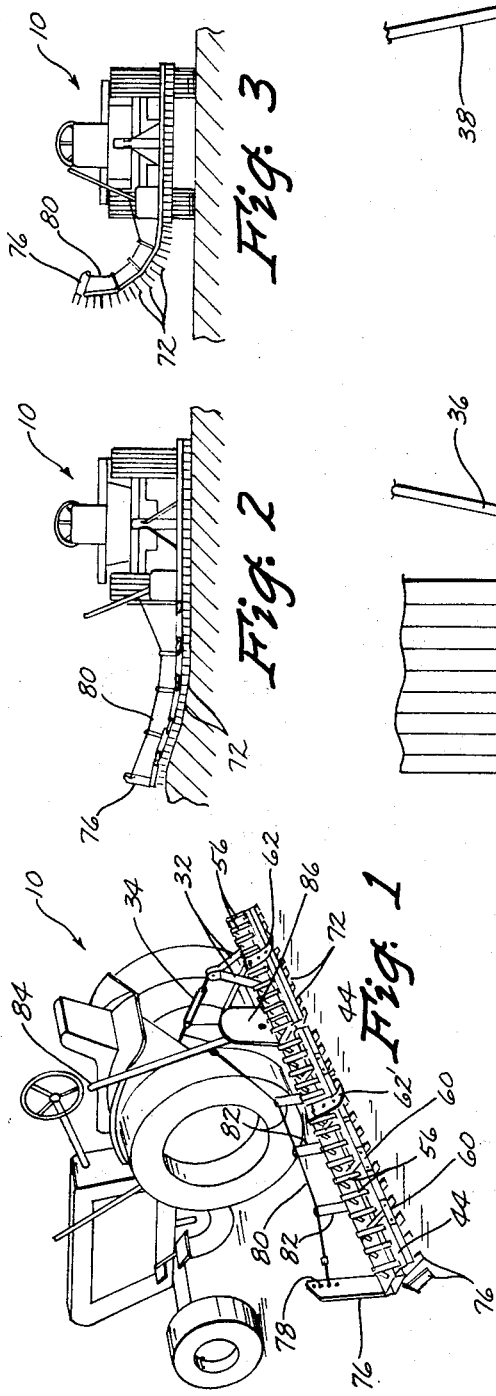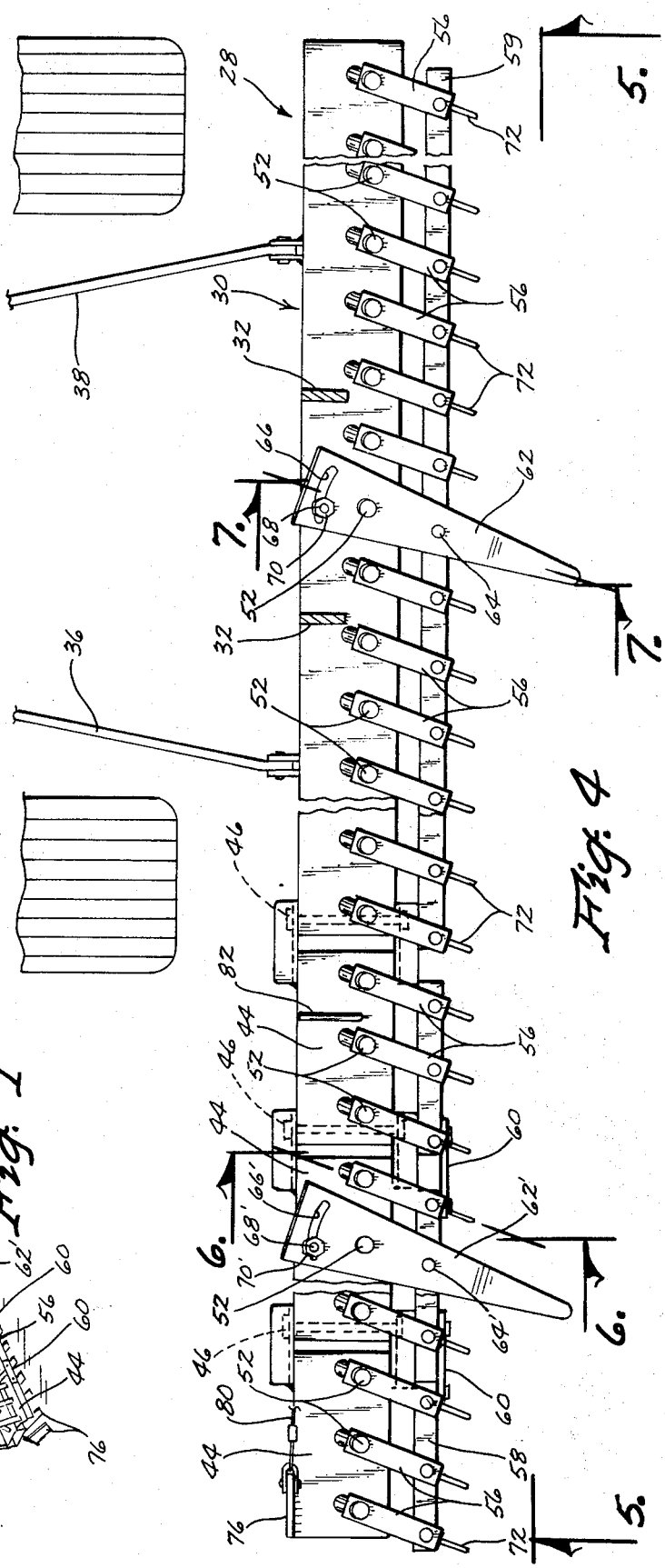

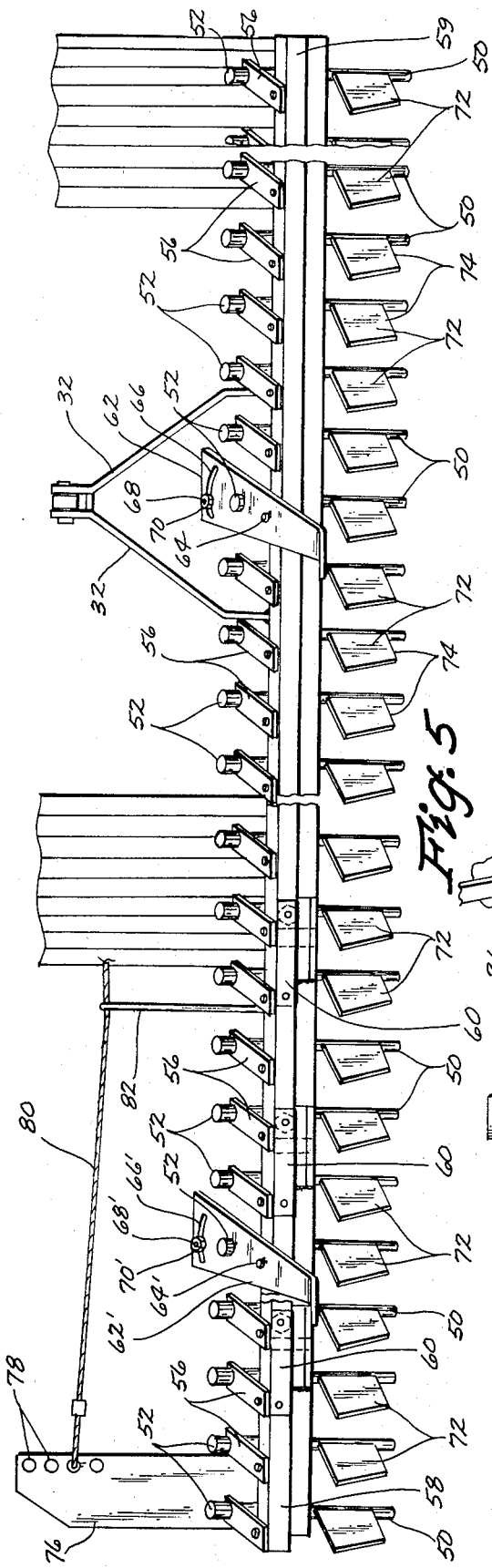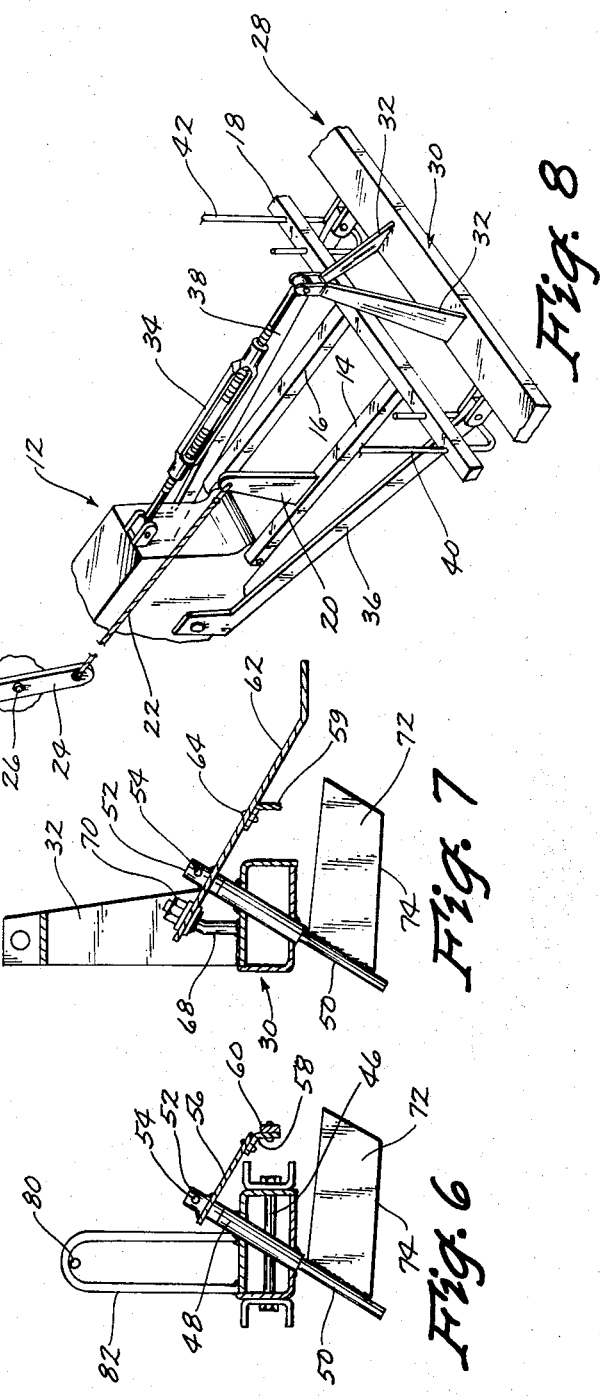

SAND TRAP CONDITIONING DEVICE

Golf course sand traps are raked for the following reasons: (1) to improve the appearance of the traps; (2) to level the sand; (3) to dry the sand; (4) to move the sand which has washed down from sloped areas back into the proper position; (5) to remove grass roots; (6) to break the sand crust; and, (7) to provide a uniform depth to the sand. The maintenance of golf course sand traps has become an immense problem due to increased labor costs. Heretofore, the conventional method of maintaining or raking sand traps was to simply employ a hand rake. The manual raking of sand traps is extremely time consuming and expensive.

Therefore, it is a principal object of this invention to provide a sand trap conditioning device.

A further object of this invention is to provide a sand trap conditioning device which substantially reduces the amount of time required to rake the trap.

A further object of this invention is to provide a sand trap conditioning device including an elongated frame means having a vertically flexible portion to permit the device to conform to the contours of the trap.

A further object of this invention is to provide a sand trap conditioning device which permits the sand to be moved laterally.

A further object of this invention is to provide a sand trap conditioning device which permits sand which has been washed down from sloped areas to be moved back into the proper position.

A further object of this invention is to provide a sand trap conditioning device including a plurality of vane members which pass through the sand, the vane members being interconnected and simultaneously adjustable.

A further object of this invention is to provide a sand trap conditioning device which moves sand from below the surface up to the surface to permit it to dry.

A further object of this invention is to provide a sand trap conditioning device which is easy to operate.

A further object of this invention is to provide a sand trap conditioning device which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a rear perspective view of the device of this invention.

FIG. 2 is a rear view of the device illustrating the vertically flexible characteristics of the device.

FIG. 3 is a rear view similar to FIG. 2 except that the sand trap conditioning device has been raised out of ground engagement.

FIG. 4 is a fragmentary top elevational view of the device.

FIG. 5 is a fragmentary rear view of the device seen along lines 5—5 of FIG. 4.

FIG. 6 is a sectional view seen along lines 6—6 of FIG. 4.

FIG. 7 is a sectional view seen along line 7—7 of FIG. 4; and

FIG. 8 is a rear perspective view of the means for mounting the device on a prime mover.

The numeral 10 refers generally to a prime mover such as a garden tractor or the like having a hitch assembly 12 at the rearward end threof. Hitch assembly 12 includes a pair of arms 14 and 16 pivotally connected at their forward ends to the prime mover 10 as illustrated in FIG. 8. A transversely extending arm is secured to the rearward ends of the arms 14 and 16 and extends laterally outwardly therefrom as also illustrated in FIG. 8. Post 20 is secured to arm 14 by welding and extends upwardly therefrom. One end of cable 22 is scured to the upper end of post 20 with the other end of the cable being secured to an actuating lever 24. Movement of the lever 24 abouts its pivotal point 26 causes the arms 14 and 16 to be pivoted about their forward ends so that arm 18 is raised or lowered.

The sand trap conditioning device of this invention is referred to generally by the reference numeral 28. The numeral 30 refers to an elongated frame means having bracket 32 secured thereto and extending upwardly therefrom. Turnbuckle 34 is pivotally connected at one end thereof to the prime mover 12 and is pivotally connected at the other end thereof to the other end of the bracket 32. A pair of connecting arms 36 and 38 are pivotally connected at their rearward ends to the frame means 30 and are detachably pivotally connected at their forward ends to the prime mover 12. As seen in FIG. 8, the rearward ends of the arms 36 and 38 extend beneath the transverse arm 18. A pair of locking elements 40 and 42 are detachably received by the arm 18 and extend beneath the arms 36 and 38 respectively to provide a detachable connection between the arms 36 and 38 and the arm 18. The locking elements 40 and 42 are designed so as to permit a certain amount of movement or play between the arms 36, 38 and the arm 18. It can be seen that upward movement of the arm 18 will cause the arms 36 and 38 to also be raised thus causing the frame means 30 to be raised.

A plurality of frame members 44 are pivotally connected to each other and to the end of frame means 30 by the bolts 46 as illustrated in FIGS. 4 and 6. The frame means 30 and the frame members 44 have a plurality of spaced apart tubes 48 secured thereto and extending downwardly and forwardly therethrough as illustrated in FIGS. 6 and 7. Teeth 50 are rotatably mounted in the tubes 48 and have collars 52 secured to the upper ends thereof by means of setscrews 54 or the like. Fingers 56 are secured to the collars 52 by welding or the like and extend rearwardly therefrom as illustrated in FIGS. 5 and 6. The fingers 56 on each of the frame members 44 are interconnected by a plate 58. The plates 58 on each of the frame members 44 are pivotally connected by means of a strap 60. The fingers 56 on frame means 30 are interconnected by a plate 59.

The numeral 62 refers to an adjusting handle or plate provided on frame means 30 which is connected to plate 59 by rivet 64. Handle 62 is connected to a collar 52 by welding or the like as illustrated in FIG. 7. The forward end of the handle 62 is provided with an arcuate slot 66 which receives the upper end of a bolt member 68 secured to and extending upwardly from frame means 30. Nut 70 may be tightened with respect to the bolt 68 to maintain the handle 62 in various of its positions and may be loosened to permit the handle 62 to be moved so that plate 59 connected thereto will be moved laterally. The lateral movement of the plate 59 causes all of the fingers 56 on the frame means 30 to be also moved laterally due to the interconnection therewith. Thus, the adjustment handle 62 permits all of the teeth 50 and the vanes 72 thereon to be simultaneously adjustably rotated with respect to the tubes 48 and the frame means 30.

The numeral 62' refers to an adjusting handle or plate provided on the frame members 44 which is connected to one of the plates 58 by rivet 64'. Handle 62' is connected to a collar 52 by welding or the like. The forward end of the handle 62' is provided with an arcuate slot 66' which receives the upper end of a bolt member 68' secured to and extending upwardly from the frame member 44. Nut 70' may be tightened with respect to the bolt 68' to maintain the handle 62' in various of its positions and may be loosened to permit the handle 62' to be moved so that the plate 58 connected thereto will be moved laterally. The lateral movement of the plate 58 causes all of the fingers 56 on the frame members 44 to be moved laterally due to the interconnection therewith. Thus, the adjustment handle 62' permits all of the teeth 50 and the vanes 72 on the frame members 44 to be simultaneously adjustably rotated with respect to the tubes 48. As seen in FIGS. 6 and 7, the vanes 72 are secured to the lower ends of the teeth 50 and extend rearwardly therefrom. As seen in FIGS. 6 and 7, the bottom edge 74 of the vanes 72 is positioned above the lower end of the teeth 50.

Post 76 is secured to the outermost frame member 44 and extends upwardly therefrom as illustrated in FIG. 5. A plurality of spaced apart openings 78 are provided in the upper end of the post 76 to permit one end of the cable 80 to be selectively secured to the post 76. The numeral 82 refers to an inverted U-shaped yoke which is secured to the upper inner ends of the frame members 44 as illustrated in FIGS. 5 and 6. The cable 80 extends through the yokes 82 and is connected to a lever 84 which is pivotally connected to a plate 86 secured to the frame means 30. Pivotal movement of the lever 84 causes the cable 80 to pull the frame members 44 upwardly and inwardly to the position illustrated in FIG. 3 if so desired. Movement of the lever 24 permits the entire device 28 to be raised and lowered as desired.

In operation, the device 28 is quickly and easily secured to the prime mover 12. The turnbuckle 34 is adjustably rotated to pivot the frame means 30 and the frame members 44 to the proper angle. The prime mover 12 is then driven into the trap and the lever 24 operated so as to lower the frame means 30 with respect to the prime mover so that the teeth 50 and vanes 72 thereon move into engagement with the sand. The lever 84 is then operated so as to lower the frame members 44 to permit the teeth 50 and vanes 72 thereon to move into engagement with the sand. The plate 86 would have a plurality of spaced apart stops on the forward side thereof to maintain the lever 84 in various of its positions. The adjustment handles 62 and 62' may then be selectively moved to pivot the vanes 72 to the proper or desired angle. The adjustment handles 62 and 62' could have been selectively positioned prior to the device being lowered into engagement with the sand.

Movement of the device 28 through the sand by the prime mover 10 causes the teeth 50 to penetrate the sand at the approximate angle illustrated in FIG. 6. The inclination of the teeth 50 causes the sand below the surface to be moved upwardly to the surface so as to permit the sand to dry. The inclination of the teeth 50 also serves to maintain the teeth in the sand as the prime mover 10 pulls the same through the trap. The vanes 72 also permit the sand to be moved laterally with respect to the prime mover 10 so that the sand can be moved back to the proper position. This feature is especially desirable along the slopes of a trap since the sand thereon tends to wash downwardly. The vanes 72 permit the sand to be moved upwardly onto the slopes and such action is enhanced by the flexible characteristics of the frame members 44. The oblique relationship of the teeth 50 and the vanes 72 with respect to the sand aids in turning over the sand much like a plow so that the wet sand beneath the surface is moved upwardly to the surface to permit it to dry.

The fact that the vanes 72 are positioned slightly above the lower ends of the teeth 50 permits the device to "float" to limit the penetration of the teeth 50 into the sand.

Thus it can be seen that the device accomplishes at least all of its stated objectives.

I claim:

1. A sand trap conditioning device, comprising,
   an elongated laterally extending frame means adapted for towing in a direction transverse to the longitudinal axis of said frame means said frame means having forward and rearward ends,
   a plurality of substantially flat vanes having a longitudinal axis, movably secured to said frame means and being positioned therebelow said vanes secured to said frame by means adapted to provide pivotal movement about an axis which lies in a vertical plane parallel to the direction of foreward motion, the upwardly and downwardly extending portions of said axis being oblique to vertical such that the downward axis portion extends in the direction of forward motion, said vanes having upper and lower edges and rearward and forward ends, the forward ends of said vanes being, said vanes being selectively adjustably mounted on said frame means to permit said vanes to be moved between first and second positions relative to said frame means, said vanes having their longitudinal axes disposed substantially parallel to the direction of travel when in their said first position, said vanes being disposed in an oblique plane with respect to the direction of travel when in their second position, said vanes engaging the sand as said frame means is moved with respect to said sand to move the sand upwardly and laterally from the lower ends of said vanes.

2. The device of claim 1 wherein a plurality of spaced apart teeth are rotatably mounted on said frame means adjacent their upper ends and extend downwardly and forwardly with respect to the vertical axis of said frame means so as to define said axes, said vanes being secured at their forward ends to said teeth below said frame means, said vanes extending rearwardly from said teeth.

3. The device of claim 2 wherein the lower edges of said vanes are positioned above the lower ends of said teeth.

4. The device of claim 2 wherein a finger is operatively secured to each of said teeth above said frame means for rotation therewith, and adjustment means secured to and extending between said fingers to permit said fingers to be simultaneously moved to cause said teeth to be rotated with respect to said frame means.

5. The device of claim 2 wherein said frame means comprises a plurality of frames pivotally secured toether about horizontal axes in an end-to-end relationship, and a cable means secured at one end to the outer end of the outermost frame, and means connected to the other end of said cable means to pivotally move said frames with respect to each other at times.

* * * * *